US005911317A

United States Patent [19]

Tsai

[11] Patent Number: 5,911,317

[45] Date of Patent: Jun. 15, 1999

[54] LIGHT PERMEABLE METAL PLATED RUBBER KEY

[75] Inventor: Jason Tsai, Taipei Hsien, Taiwan

[73] Assignee: Silitek Corporation, Taipei, Taiwan

[21] Appl. No.: 08/917,498

[22] Filed: Aug. 26, 1997

[51] Int. Cl.[6] .......... B32B 25/04

[52] U.S. Cl. .......... 200/514; 264/132; 400/490; 200/314

[58] Field of Search .......... 200/514, 314, 200/302.2; 400/490, 493; 428/201, 203, 204, 207, 209; 264/132

[56] References Cited

U.S. PATENT DOCUMENTS

| | | | |
|---|---|---|---|
| 5,234,744 | 8/1993 | Kenmochi | 200/314 X |
| 5,413,840 | 5/1995 | Mizuno | 428/207 X |

FOREIGN PATENT DOCUMENTS

| | | | |
|---|---|---|---|
| 2097836 | 5/1987 | Japan | 428/201 |
| 154447 | 6/1988 | Japan | 428/201 |

*Primary Examiner*—Renee S. Luebke
*Attorney, Agent, or Firm*—Rosenberg, Klein & Bilker

[57] ABSTRACT

The subject invention relates to a type of light permeable metal plated rubber key, comprising mainly a rubber key that is made of silicone rubber, or a key with a hardened head (hardness: SHORE D45 or higher); on top of the key is printed with light permeable ink, and processed with a metal plating to form a light permeable metal plated key; so designed to replace rubber keys, and keys with adhered rubber and silicone rubber, to reduce production costs, simplify production process, upgrade product added value and product reliability.

4 Claims, 3 Drawing Sheets

LIGHT PERMEABLE METAL PLATED RUBBER KEY

BACKGROUND OF THE INVENTION

1. FIELD OF THE INVENTION

The subject invention relates to a type of light permeable metal plated rubber key. More particularly, the present invention is directed to a key that can be applied to all kinds of electronic and telecommunication products such as mobile phones, telephone sets, remote controls, hi-fi equipment, etc.

2. PRIOR ART

Conventionally, a prior art light permeable silicone rubber key or light permeable metal-pleated rubber key is generally made of a plastic material, such as polycarbonate or acrylate resin or ABC resin, which is then subjected to surface metal plating, laser processing and printing to display a letter or figure thereon. However, the first type of light permeable silicone rubber key is made of silicone rubber light permeable material having an appearance and quality tone that is no better than a metal product. The second type of conventional metal plated key is made of a plastic material which is subjected to a metal plating process before it is adhered with silicone rubber, so the production process is quite sophisticated and the production costs are high. Additionally, there is the problem of reliability of the product because the joint between the plastic part and the rubber part often falls apart.

SUMMARY OF THE INVENTION

The primary purpose of the subject invention is to provide a type of light permeable metal plated rubber key, involving a base part that is made of silicone rubber which has been subjected to a hardening process, or to a further monobloc forming process with the mixture of polycaprolactone resin and acrylate resin to form a hard-head key. The light permeable metal plated rubber key is designed to replace a general light permeable key or rubber key, or a key with a plastic part adhered to a silicone rubber part. The structure of the subject key is designed to reduce production costs, simplify the production process and upgrade the product's added value and reliability.

To enable a better understanding of the characteristics and technical content of the subject invention, please refer to the following detailed description and drawings. However, the attached drawings are only for the purposes of reference and description, which shall not be based to restrict or limit the subject invention. The drawings of the embodiment are:

BRIEF DESCRIPTION OF NUMERALS

1 base part (may be an ordinary silicone rubber key or a monobloc formed hard-head rubber key)
2 light permeable ink
3 first protective layer
4 metal plating film
5 letter or figure
6 second protective layer

DETAILED DESCRIPTION OF PREFERRED EMBODIMENT

Figure 1:
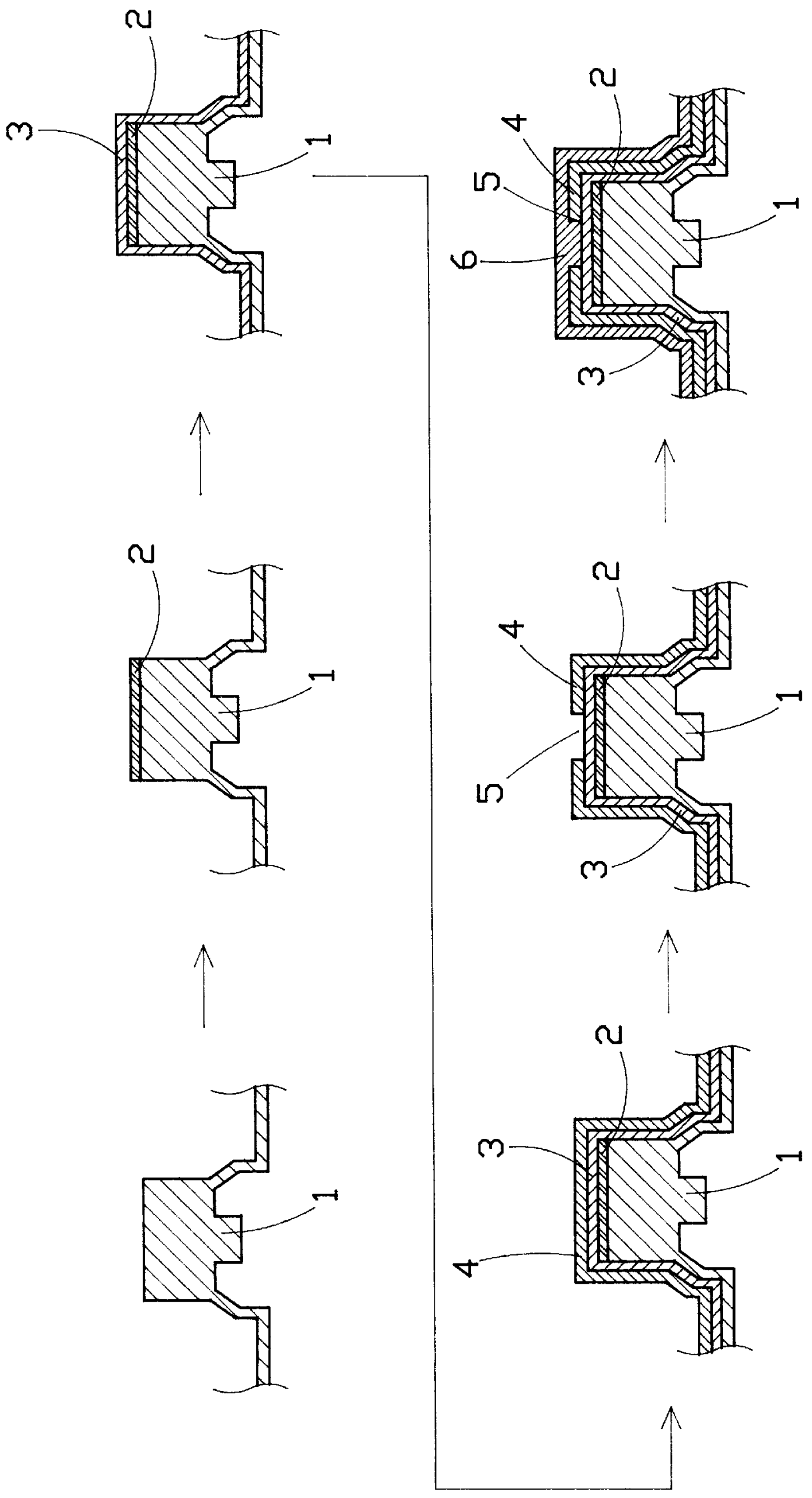
FIG. 1 is a diagram of the production procedures of the invention.
Figure 2:
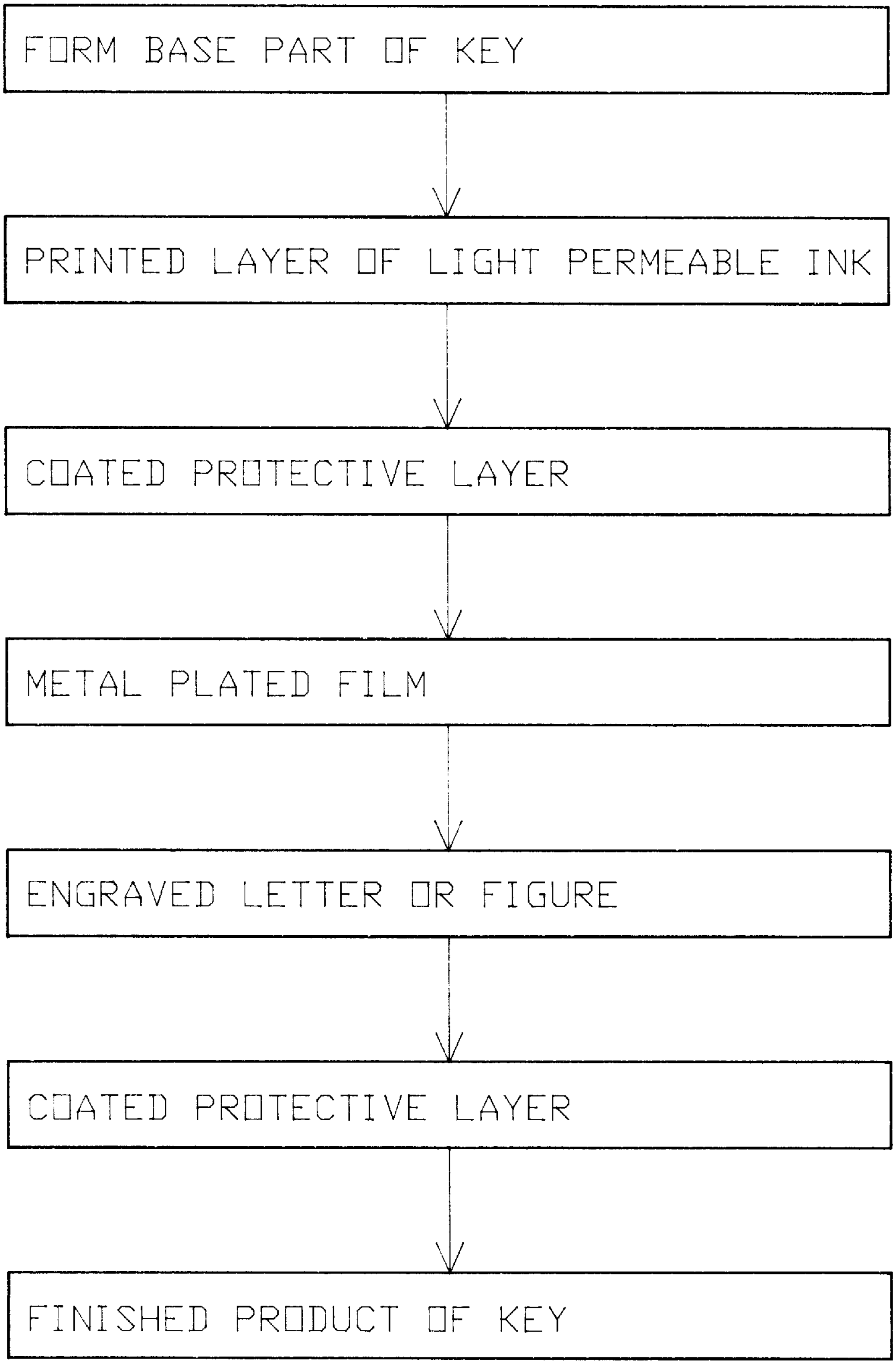
FIG. 2 is a production flow chart of the subject invention.

Please refer to FIGS. 1 and 2 which are respectively a diagram of the production procedures of the subject invention and a production flow chart of the subject invention. The subject invention relates to the presentation of a type of light permeable metal plated rubber key. The light permeable metal plated rubber key includes a base part 1 made of silicone rubber that has been subjected to a hardening process, or a base part 1 made of silicone rubber that has been subjected to a compression or an extrusion process to form a hardened head having a hardness of SHORE D45 or higher. Then, a layer of light permeable ink 2 (silicone rubber type) is sprayed or printed, in a required color, onto the base part 1. Next, a protective layer 3 of such material as polycaprolactone resin or acrylate resin is painted onto the light permeable ink layer 2 to form a surface hardened key. Then, a layer of vacuum spray plating, that may be Ni, Cr, Ti, Al, Cu, Sn, Ag or Au forms metal plated film 4 on the first protective layer 3. Subsequently, laser engraving technology is employed to engrave the metal plated film 4 to display the required letter or FIG. 5. Finally, a second protective layer 6 of such material as polycaprolactone resin or acrylate resin is coated onto the metal plated film 6 and the letter or FIG. 5, to form a light permeable metal plated key.

Figure 3:
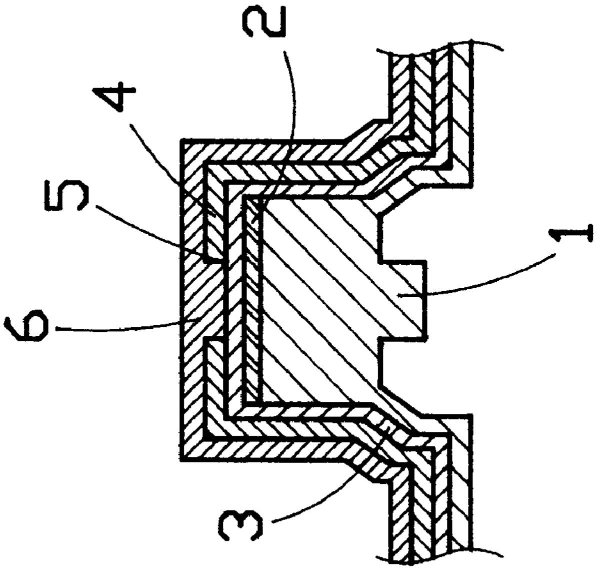
FIG. 3 is a cross-sectional view of the subject invention.

Please refer to FIG. 3, which is a cross-sectional view of the subject invention. The subject light permeable metal plated rubber key comprises a light permeable base part 1, a layer of light permeable ink 2 disposed on the base part 1. On the ink layer 2, a hardened first protective layer 3 is disposed on the ink layer 2, with a vacuum spray metal plated film layer 4 covering the first protective layer 3. The metal plated film 4 is laser engraved to form a particular character. A second protective layer 6 is coated on the engraved layer 4 to form a light permeable metal plated key. The subject invention can be used to replace a light permeable metal plated rubber key, or a key with the combination of a light permeable metal film and silicone rubber that are adhered together. The features of the subject invention include: (1) reduced production costs and a simplified production process, (2) no requirement for a plastic mold, (3) enhanced appearance and quality of the finished product that will upgrade the added-value and reliability of the product.

Summing up, the subject invention improves on the weaknesses of the conventional plastic key, i.e. sophisticated production procedures, higher costs, etc.

It is hereby declared that the above description, covering only the preferred embodiment, should not be construed to limit or restrict the subject claim, and that all equivalent structural and/or configurational variations and/or modifications deriving from the subject description with drawings and contents therein, should reasonably be included in the intent of the subject invention and the subject claim.

I claim:

1. A light permeable metal plated rubber key, comprising:

a base part constructed of a formed silicone rubber member;

a light permeable ink layer applied directly on at least a portion of said base part;

a first protecting layer completely overlaying said light permeable ink layer and said base part;

a metal layer overlaying said first protecting layer and having a portion thereof engraved to define a shape corresponding to a symbol, said engraved portion exposing said first protecting layer to thereby display a symbol-shaped portion of said light permeable ink layer therethrough; and, a second protective layer completely overlaying said metal layer and said engraved portion.

2. The light permeable metal plated rubber key as recited in claim 1 where said metal layer is applied by a vacuum spray plating process.

3. The light permeable metal plated rubber key as recited in claim 1 where said silicone rubber base part is hardened.

4. The light permeable metal plated rubber key as recited in claim 3 where said silicone rubber base part is hardened to at least a Shore hardness of at least D45.

* * * * *